(12) United States Patent
 Kanzaki et al.

(10) Patent No.: US 11,922,087 B2
(45) Date of Patent: Mar. 5, 2024

(54) INFORMATION PROCESSING APPARATUS AND NON-TRANSITORY COMPUTER READABLE MEDIUM STORING INFORMATION PROCESSING PROGRAM

(71) Applicant: FUJIFILM Business Innovation Corp., Tokyo (JP)

(72) Inventors: Ami Kanzaki, Kanagawa (JP); Kodai Suzuki, Kanagawa (JP); Kei Arakawa, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 643 days.

(21) Appl. No.: 16/794,239

(22) Filed: Feb. 19, 2020

(65) Prior Publication Data
US 2021/0072940 A1 Mar. 11, 2021

(30) Foreign Application Priority Data

Sep. 6, 2019 (JP) ................................ 2019-163216

(51) Int. Cl.
*G06F 3/14* (2006.01)
*G06T 11/00* (2006.01)
(52) U.S. Cl.
CPC ............... *G06F 3/14* (2013.01); *G06T 11/00* (2013.01)
(58) Field of Classification Search
None
See application file for complete search history.

(56) References Cited

U.S. PATENT DOCUMENTS

| 2010/0238178 | A1 | 9/2010 | Sawazaki et al. |
| 2015/0170422 | A1 | 6/2015 | Aoyama et al. |
| 2019/0388647 | A1* | 12/2019 | Bender ................... G06F 3/011 |
| 2020/0368616 | A1* | 11/2020 | Delamont ............... A63F 13/65 |
| 2022/0309838 | A1* | 9/2022 | Nakai .................... G06V 40/20 |

FOREIGN PATENT DOCUMENTS

| JP | 2010224145 | 10/2010 |
| JP | 2012078224 | 4/2012 |
| JP | 2015115034 | 6/2015 |
| JP | 2017068629 | 4/2017 |
| JP | 2018006583 | 1/2018 |
| JP | 6332652 | 5/2018 |
| JP | 2018094189 | 6/2018 |
| JP | 2019061556 | 4/2019 |

OTHER PUBLICATIONS

"Notice of Reasons for Refusal of Japan Counterpart Application", dated Mar. 14, 2023, with English translation thereof, p. 1-p. 5.
Office Action of Japan Counterpart Application, with English translation thereof, dated May 30, 2023, pp. 1-5.
"Decision of Refusal of Japan Counterpart Application", dated Sep. 5, 2023, with English translation thereof, p. 1-p. 5.

* cited by examiner

*Primary Examiner* — Yi Wang
(74) *Attorney, Agent, or Firm* — JCIPRNET

(57) ABSTRACT

An information processing apparatus includes a processor configured to control a display of notification related to a notification target present outside a field of view of a user depending on a relationship between attribute information of the notification target and attribute information of the user.

17 Claims, 9 Drawing Sheets

FIG. 4

| IDENTIFICATION ID | PROCESS ID | SCHEDULED STARTING POINT OF TIME | SCHEDULED ENDING POINT OF TIME | RESPONSIBILITY ID |
|---|---|---|---|---|
| 01 | 123 | 10:00:00 | 10:20:00 | A01 |
|  | 456 | 10:20:00 | 10:40:00 | A02 |
|  | 789 | 11:30:00 | 11:40:00 | A03 |
| 02 | 456 | 10:40:00 | 11:00:00 | A01 |
|  | 123 | 11:00:00 | 11:30:00 | A03 |
| ... | ... | ... | ... | ... |

30

INFORMATION PROCESSING APPARATUS AND NON-TRANSITORY COMPUTER READABLE MEDIUM STORING INFORMATION PROCESSING PROGRAM

CROSS-REFERENCE TO RELATED APPLICATIONS

This application is based on and claims priority under 35 USC 119 from Japanese Patent Application No. 2019-163216 filed Sep. 6, 2019.

BACKGROUND

(i) Technical Field

The present invention relates to an information processing apparatus and a non-transitory computer readable medium storing an information processing program.

(ii) Related Art

JP2015-115034A discloses an information display system that includes a transmissive type head-mounted display including a display/projection unit for displaying a drawing object on a virtual screen in superimposition with an outer view, and a detection unit that detects information specifying a position and/or an angle of the virtual screen with respect to the outer view. A control unit that controls the transmissive type head-mounted display includes a drawing object generation unit that generates the drawing object based on data created by an application program and sets a drawing position of the drawing object on the virtual screen by referring to the information detected by the detection unit, and a drawing processing unit that draws the drawing object at the drawing position on the virtual screen by controlling the display/projection unit. The drawing object generation unit categorizes the drawing object as a first object of which a drawing position on the virtual screen is changed such that a positional relationship with respect to the outer view is maintained in a case where the position and/or the angle of the virtual screen with respect to the outer view is changed, and a second object of which a drawing position on the virtual screen is not changed even in a case where the position and/or the angle of the virtual screen with respect to the outer view is changed. The drawing object generation unit sets a drawing priority degree of the first object to be higher than a drawing priority degree of the second object. The drawing processing unit preferentially draws the drawing object having a higher drawing priority degree in a case where the drawing positions of plural drawing objects having different drawing priority degrees overlap with each other.

JP2010-224145 discloses an image generation system including a sensor information acquisition unit that acquires sensor information from a wearable sensor of a user, a user information specifying unit that specifies positional information and direction information of the user on a virtual map based on the sensor information, a positional relationship information specifying unit that specifies positional relationship information between a content presentation location and the user on the virtual map based on the positional information and the direction information of the user, and an image generation unit that generates a display image based on the specified positional relationship information. In a case where a proceeding direction of the user is specified by the direction information, the positional relationship information specifying unit sets a first determination area of a given angular range that includes the proceeding direction of the user and does not include a direction orthogonal to the proceeding direction, and determines whether or not the content presentation location is positioned in the set first determination area. The positional relationship information specifying unit sets a second determination area of a given angular range that includes the direction orthogonal to the proceeding direction, and determines whether or not the content presentation location is positioned in the set second determination area. In a case where it is determined that the content presentation location is positioned in the first determination area, the image generation unit generates the display image in which an information image of the content presentation location is displayed. In a case where it is determined that the content presentation location is positioned in the second determination area and a head direction or a line of sight direction of the user specified by the direction information is directed toward the second determination area, the image generation unit generates the display image in which a detailed information image of the content presentation location having a higher degree of detail of presented information than the information image is displayed.

JP2016-242954 discloses a display control apparatus including a display control unit that displays a field of view image representing a field of view from a virtual viewpoint in a virtual space on a display unit as a solid view image using binocular disparity, and displays a mark indicating a specific target present outside the field of view from the virtual viewpoint in the virtual space on the display unit with a disparity based on a distance from the virtual viewpoint to the specific target such that as the distance from the virtual viewpoint to the specific target is decreased, the mark is displayed on a nearer side.

SUMMARY

There is a technology for providing information such as information related to a notification target present outside the field of view and positional information of the notification target to the head-mounted display using the positional information of the notification target and the positional information of the user.

However, the positional information of the notification target with respect to the positional information of the user is simply provided, and there is no further consideration of a relationship between the user and the notification target. Thus, in a case where notification related to the notification target is performed, the user needs to check details of the notification, and it may not be possible to determine whether or not the notification is necessary for the user.

Aspects of non-limiting embodiments of the present disclosure relate to an information processing apparatus and a non-transitory computer readable medium storing an information processing program enabling a user to determine notification related to the user more easily than the user does with a display that is not based on attribute information of the user, in a case where notification related to a notification target from an outside of a field of view is performed.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a processor configured to control a display of notification related to a notification target present outside a field of view of a user depending on a relationship between attribute information of the notification target and attribute information of the user.

BRIEF DESCRIPTION OF THE DRAWINGS

Exemplary embodiment(s) of the present invention will be described in detail based on the following figures, wherein:

FIG. 4 is a schematic diagram illustrating one example of a process information database according to a first exemplary embodiment;

DETAILED DESCRIPTION

First Exemplary Embodiment

Hereinafter, exemplary embodiments of the invention of the present disclosure will be described in detail with reference to the drawings. An information processing apparatus 10 according to the present exemplary embodiment will be described as an optical transmissive type head-mounted display that is a terminal mounted on a head of a user and displays an image, a text, and the like in superimposition with a scene visually recognized by the user. However, the description is not for limitation purposes. For example, the information processing apparatus 10 may be a video transmissive type head-mounted display that displays an image captured by a camera on a display. In addition, the information processing apparatus 10 according to the present exemplary embodiment will be described as being integrated with a display that displays an image, a text, and the like. However, the description is not for limitation purposes. For example, the information processing apparatus 10 may be a terminal such as a personal computer or a tablet, or a server managing notification and may transmit the image, the text, and the like to a display device mounted on the user through a network.

Figure 1:
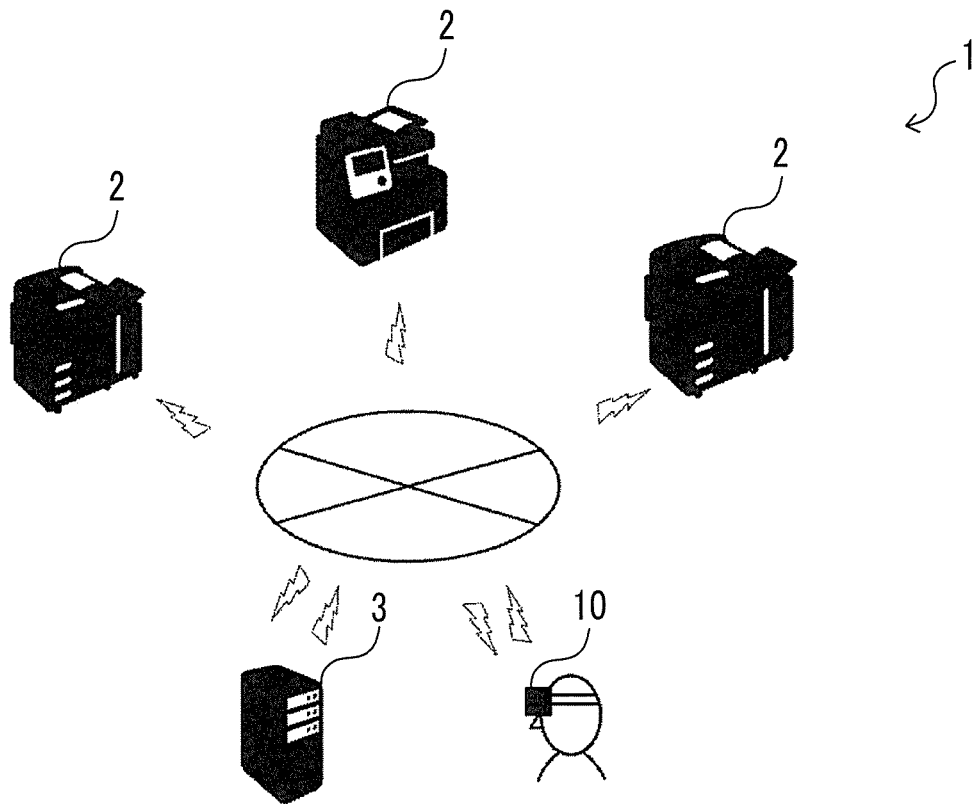
FIG. 1 is a schematic diagram illustrating one example of a configuration of an information processing system according to each exemplary embodiment.

FIG. 1 is a schematic diagram illustrating one example of a configuration of an information processing system 1 according to the present exemplary embodiment. As illustrated in FIG. 1, the information processing system 1 according to the present exemplary embodiment is configured by connecting an apparatus 2, a notification management server 3, and the information processing apparatus 10 to the network.

For example, the apparatus 2 is a printer, a continuous feed printer, or the like that performs a process such as printing and is arranged in an environment where the user works. The apparatus 2 notifies the user of information of ink depletion, a paper jam, and the like through the network. Hereinafter, the information of which the apparatus 2 notifies the user will be referred to as a notification target.

The notification management server 3 receives notification transmitted from the apparatus 2 and transmits the notification to the information processing apparatus 10.

The information processing apparatus 10 receives the notification from the notification management server 3 and displays the notification target such as positional information (coordinates) of the apparatus 2 arranged in a three-dimensional space and notification details included in notification associated with the coordinates of the apparatus 2 on the display. The notification target is associated with the coordinates of the apparatus 2 transmitting the notification in the three-dimensional space and is displayed around the apparatus 2. In a case where the notification target is not included in a field of view of the user, the information processing apparatus 10 provides guidance to a position of the notification target by displaying an arrow indicating the position of the notification target. Hereinafter, the coordinates associated with the notification target will be referred to as the position of the notification target.

The notification target according to the present exemplary embodiment is described as being associated with the coordinates of the apparatus 2. However, the description is not for limitation purposes. The notification target may be associated with any coordinates separated from the apparatus 2 or may be associated with predetermined coordinates. In addition, the display according to the present exemplary embodiment is described as a display of the arrow. However, the description is not for limitation purposes. The display may be an image, a text, and the like, or a control for not performing any display may be performed in a case where a predetermined condition is satisfied. In addition, the information processing apparatus 10 according to the present exemplary embodiment is described as receiving the notification from the notification management server. However, the description is not for limitation purposes. The information processing apparatus 10 may receive the notification from the apparatus 2.

Figure 2:
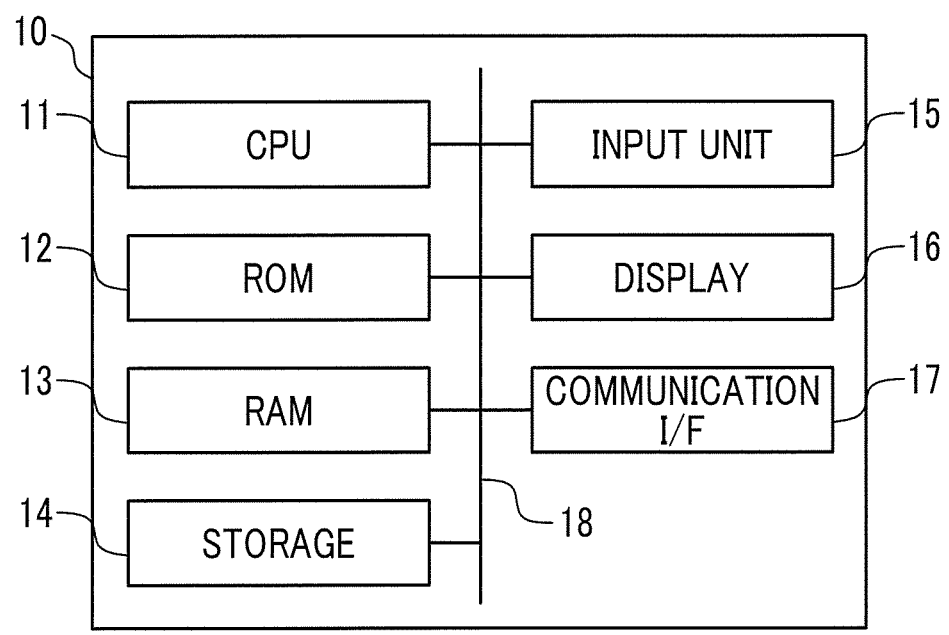
FIG. 2 is a block diagram illustrating one example of a hardware configuration of an information processing apparatus according to each exemplary embodiment.

Next, a hardware configuration of the information processing apparatus 10 will be described with reference to FIG. 2. FIG. 2 is a block diagram illustrating one example of the hardware configuration of the information processing apparatus 10 according to the present exemplary embodiment. As illustrated in FIG. 2, the information processing apparatus 10 according to the present exemplary embodiment is configured to include a central processing unit (CPU) 11, a read only memory (ROM) 12, a random access memory (RAM) 13, a storage 14, an input unit 15, a display 16, and a communication interface (communication I/F) 17. The CPU 11, the ROM 12, the RAM 13, the storage 14, the input unit 15, the display 16, and the communication I/F 17 are connected to each other through a bus 18. The CPU 11 is one example of a processor.

The CPU 11 manages and controls the whole information processing apparatus 10. The ROM 12 stores various programs, data, and the like including an information processing program used in the present exemplary embodiment. The RAM 13 is a memory that is used as a work area at a time of executing various programs . The CPU 11 performs a process of displaying the image, the text, and the like by loading the program stored in the ROM 12 into the RAM 13 and executing the program. For example, the storage 14 is a hard disk drive (HDD), a solid state drive (SSD), or a flash memory. The information processing program and the like may be stored in the storage 14. The input unit 15 includes a camera mounted on a head-mounted display, a sensor incorporated in the head-mounted display, and the like. The display 16 displays the image, the text, and the like. The communication I/F 17 transmits and receives data.

Figure 3:
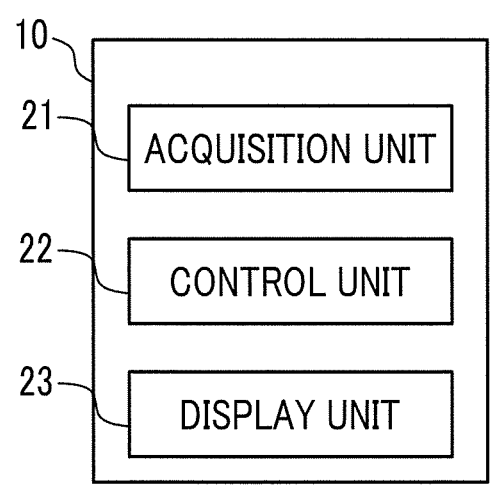
FIG. 3 is a block diagram illustrating one example of a functional configuration of the information processing apparatus according to each exemplary embodiment.

Next, a functional configuration of the information processing apparatus 10 will be described with reference to FIG. 3. FIG. 3 is a block diagram illustrating one example of the functional configuration of the information processing apparatus 10 according to the present exemplary embodiment.

As illustrated in FIG. 3, the information processing apparatus 10 includes an acquisition unit 21, a control unit 22, and a display unit 23. The CPU 11 functions as the acquisition unit 21, the control unit 22, and the display unit 23 by executing the information processing program.

The acquisition unit 21 acquires information (hereinafter, referred to as "environment information") of a position of the user and a position of the apparatus 2 arranged in an environment where the user is positioned, attribute information of the notification target, and attribute information of the user. The environment information includes information (hereinafter, referred to as "identification information") for identifying the apparatus related to the notification target, the position (coordinates) of the apparatus 2, and the position (coordinates) of the user. The attribute information of the notification target includes the identification information, the notification details, information (hereinafter, referred to as "process information") related to a process associated with the apparatus, stepwise determined information, and information (hereinafter, referred to as "apparatus affiliation information") indicating an affiliation to which the apparatus related to the notification target belongs. The attribute information of the user includes information (hereinafter, referred to as "user information") for identifying the user and information (hereinafter, referred to as "user affiliation information") indicating an affiliation to which the user belongs.

The stepwise determined information according to the present exemplary embodiment will be described as a type of information such as "INFO", "WARNING", and "ERROR". However, the description is not for limitation purposes. For example, the stepwise determined information may be an urgency degree that is shown stepwise in numbers and indicates a degree of urgency of notification, or may be a priority that indicates a degree of priority of notification. In addition, the user affiliation information according to the present exemplary embodiment includes a degree of permission (hereinafter, referred to as a "permission degree") to perform management for each user belonging to the affiliation.

In addition, the environment information according to the present exemplary embodiment includes coordinates of the user and a direction of a line of sight of the user in the three-dimensional space, information of the coordinates of each apparatus 2, and the identification information. A method of creating the environment information is not particularly limited. The environment information may be created using a well-known technology. For example, a global positioning system (GPS) may be mounted in the information processing apparatus 10. The identification information of each apparatus 2 may be acquired by reading a Quick Response (QR) code provided in the apparatus 2, and a map on which an arrangement position of the apparatus 2 is registered may be created. The information processing apparatus 10 may estimate the position and the direction of the user by comparing the image captured by the camera with the map associated with the image captured in advance, or may estimate the position and the direction of the user using an electronic compass, a light detection sensor, an acceleration sensor, and the like. In addition, for example, the identification information according to the present exemplary embodiment will be described as an identification ID (IDentification) that is information for identifying the apparatus related to the notification target and associates the environment information, the notification target, and the process information with each other.

The control unit 22 determines whether or not the notification target for which the notification is performed is included in the field of view using the environment information and the attribute information of the notification target. Whether or not coordinates of the notification target are included in a range of the line of sight of the user is performed by specifying the coordinates of the notification target in the three-dimensional space from the environment information and the attribute information of the notification target and deriving the range of the line of sight of the user from the coordinates and the direction of the line of sight of the user. In the present exemplary embodiment, a determination as to whether or not the notification target is included in the field of view using the coordinates and the direction of the line of sight of the user and the coordinates of the notification target is described. However, the description is not for limitation purposes. Whether or not the notification target is included may be determined by deriving the range of the line of sight of the user using the image captured by the camera, or may be determined by detecting the notification target from the image.

The control unit 22 controls a display of the notification related to the notification target present outside the field of view of the user depending on a relationship between the attribute information of the notification target and the attribute information of the user. Specifically, the control unit 22 controls the notification to be displayed based on the user information, the identification information, and the process information. For example, the control unit 22 sets a high degree of association (hereinafter, referred to as an "association degree") between the notification target and the user in a case where the notification is for the notification target of the apparatus for which a work in the process information is scheduled, and controls the notification to be displayed depending on the association degree.

In addition, the control unit 22 controls the notification to be displayed based on whether or not common information is included in the user information and the attribute information of the notification target. For example, the common information is the user information. That is, the control unit 22 sets a further high association degree in a case where the notification is for the notification target of the apparatus for which the work in the process information is scheduled, and where the user related to the notification target in the process information matches the user in the user information.

In addition, the control unit 22 sets a high association degree in a case where the affiliation of the notification target in the attribute information of the notification target matches the affiliation in the attribute information of the user, and controls the notification to be displayed depending on the association degree. The control unit 22 sets a high association degree depending on a level of the permission degree. Specifically, the control unit 22 refers to the apparatus affiliation information and the user affiliation information and sets a high association degree in a case where the notification is performed for the user belonging to the affiliation related to the notification target, and sets a further high association degree in a case where the notification is performed for the user (for example, a management user) having a further high permission degree.

In addition, in a case where the notification target is included in the field of view, the control unit 22 controls the display of the notification related to the notification target present in the field of view of the user depending on the attribute information of the notification target.

In a case where the notification target is present outside the field of view, the display unit 23 displays the notification corresponding to the attribute information of the notification target and the attribute information of the user on the display. In addition, in a case where the notification target is included outside the field of view, the display unit 23 displays the notification corresponding to the attribute information of the notification target. The display unit 23 changes a form of displaying the notification depending on the stepwise determined information. In addition, in a case where the stepwise determined information satisfies a predetermined condition, the display unit 23 displays at least one of a text, an image, or a motion picture showing a change of an image related to the notification target in the field of view of the user in addition to the notification.

Specifically, in a case where the notification target is included in the field of view, the display unit 23 displays the notification details at a position associated with the notification target in the field of view. In a case where the notification target is not included in the field of view, the display unit 23 sets an arrow that indicates a direction of the position associated with the notification target with respect to the position of the user and displays the arrow by changing a size of the arrow depending on the association degree and changing a color of the arrow depending on the stepwise determined information. For example, the display unit 23 displays the arrow by increasing the arrow depending on a level of the association degree and changing the color of the arrow to "blue" in a case where the stepwise determined information is "INFO", "yellow" in a case where the stepwise determined information is "WARNING", and "red" in a case where the stepwise determined information is "ERROR". In addition, in a case where the stepwise determined information is "ERROR", the display unit 23 displays a message. In the present exemplary embodiment, the display of the message in a case where the stepwise determined information satisfies the predetermined condition is described. However, the description is not for limitation purposes. In a case where the stepwise determined information satisfies the predetermined condition, an image may be displayed, or a motion picture showing a change of an image may be displayed by consecutively displaying plural images of arrows or the like.

In addition, the display of the message in a case where the stepwise determined information according to the present exemplary embodiment is "ERROR" is described. However, the description is not for limitation purposes. The message may be displayed in a case of "WARNING", or the message may be displayed depending on a condition such that the message is displayed in a case of "WARNING" or "ERROR". In addition, in a case where the stepwise determined information is a number, the message may be displayed by comparing the number with a threshold value. In addition, a current point of time may be compared with a point of time of the work scheduled for the notification target, and the message may be displayed in a case where an amount of time until the point of time of the work is smaller than a predetermined amount of time. In addition, the association degree is set from the user information included in the attribute information of the user and the attribute information of the notification target. The association degree according to the present exemplary embodiment will be described as being set depending on the user information and the attribute information of the notification target.

Next, a method for the display of the arrow and the notification performed by the information processing apparatus 10 will be described with reference to FIG. 4 to FIG. 10 before description of an effect of the information processing apparatus 10. Setting of the association degree will be described with reference to FIG. 4. First, a process information database (hereinafter, referred to as a "process information DB") 30 according to the present exemplary embodiment will be described. FIG. 4 is a schematic diagram illustrating one example of the process information database 30 according to the present exemplary embodiment.

For example, as illustrated in FIG. 4, the process information DB 30 stores the identification ID, a process ID, a scheduled starting point of time, a scheduled ending point of time, and a responsibility ID. The identification ID is a number that is uniquely assigned to each apparatus 2. The process ID is a text and a number that are uniquely assigned to each process performed by the apparatus 2. The scheduled starting point of time is a scheduled point of time of starting the work by the apparatus 2. The scheduled ending point of time is a scheduled point of time of ending the work by the apparatus 2. The responsibility ID is the user information that indicates the user responsible for the process. The user information is a text and a number that are uniquely assigned to each user. In addition, in a case where a series of processes are performed by handing over the processes between apparatuses, the identical process ID is assigned as the process ID even in a case where the apparatuses are different. That is, the process information DB 30 according to the present exemplary embodiment stores information for managing the processes of the works associated with all apparatuses.

For example, in a case where the notification for the notification target having the identification ID "01" is performed, the information processing apparatus 10 determines whether or not a process (work) having the identification ID "01" is scheduled in the process information acquired from the process information DB 30 illustrated in FIG. 4. In a case where the process (work) having the identification ID "01" is set in the process information, the information processing apparatus 10 sets a high association degree and performs the notification. In addition, the information processing apparatus 10 compares the user information set in the terminal with the responsibility ID indicated by the notification target in the process information and determines whether or not the common information is included. That is, the information processing apparatus 10 compares the user information set in the terminal with the responsibility ID in the process having the identification ID "01" in the process information. In a case where the user information matches the responsibility ID, the information processing apparatus 10 sets a further high association degree and performs the notification.

The association degree according to the present exemplary embodiment is described such that a high association degree is set for the user related to the identification ID of the notification target. However, the description is not for limitation purposes. The association degree may be set by comparing the current point of time with the starting point of time. For example, a case where the current point of time is "10:30:00" in a case where the information processing apparatus 10 performs the notification for the notification target having the identification ID "01" will be described.

The information processing apparatus 10 may specify the responsibility ID of the working process from the identification ID "01" and the current point of time "10:30:00" by referring to the process information, and may set the association degree by comparing the user information of the terminal with the responsibility ID. In addition, the information processing apparatus 10 may specify the responsibility ID related to the subsequent process by specifying the process ID from the identification ID and the current point of time and compare the user information set in the terminal with the responsibility ID. In a case where the user information matches the responsibility ID, the information processing apparatus 10 may set a high association degree and perform notification that the process is being delayed.

Figure 5:
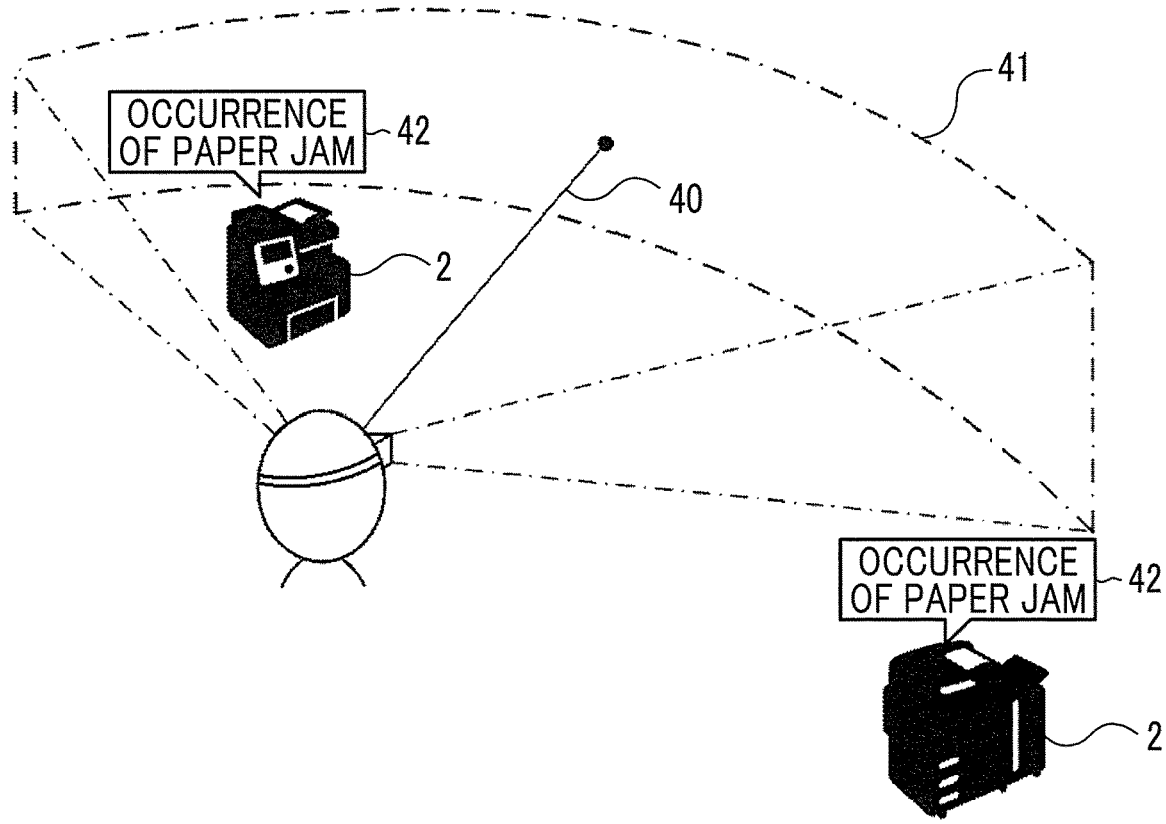
FIG. 5 is a schematic diagram illustrating one example of a range of a field of view detected by the information processing apparatus according to each exemplary embodiment.

Next, the range of the field of view detected by the information processing apparatus 10 will be described with reference to FIG. 5. FIG. 5 is a schematic diagram illustrating one example of the range of the field of view detected by the information processing apparatus 10 according to the present exemplary embodiment. The range of the field of view is one example of the field of view of the user.

For example, as illustrated in FIG. 5, as a field of view range 41, the information processing apparatus 10 sets a predetermined range that is based on a collimation axis 40 in the three-dimensional space as a reference. The information processing apparatus 10 determines whether or not a position associated with a notification target 42 is included in the field of view range 41. A method of setting the range of the field of view according to the present exemplary embodiment is not particularly limited. The range of the field of view may be set using a well-known technology. For example, in a case where a range captured by the camera is set as the range of the field of view, the range of the field of view may be set depending on a focal length of the camera, or a range in which the image captured by the camera is trimmed and displayed on the display may be set as the range of the field of view. In addition, the range of the field of view may be set by defining the range of the field of view by setting any angle of a pitch angle or a yaw angle based on the collimation axis as a reference and any focal length.

Figure 6:
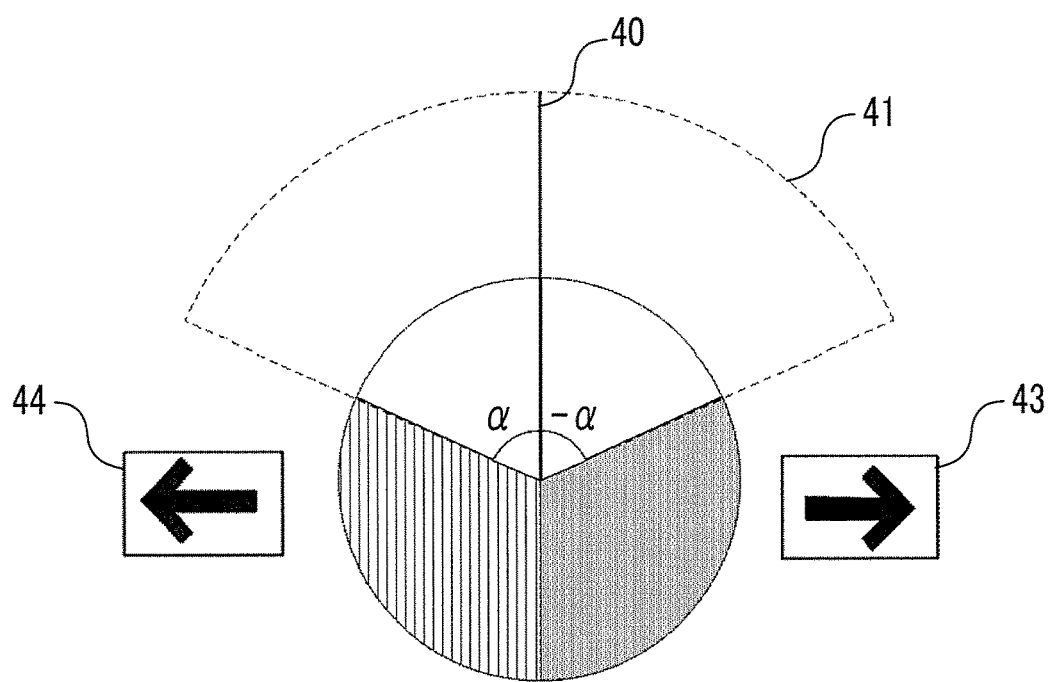
FIG. 6 is a schematic diagram illustrating one example of a relationship between an arrow displayed by the information processing apparatus according to each exemplary embodiment and a position of a notification target.

Next, a relationship between the displayed arrow and the notification target 42 will be described with reference to FIG. 6. FIG. 6 is a schematic diagram illustrating one example of a relationship between the arrow displayed by the information processing apparatus 10 according to the present exemplary embodiment and a position of the notification target 42. FIG. 6 illustrates a state where the user and the range of the field of view are seen from information of a vertical axis direction.

For example, as illustrated in FIG. 6, the information processing apparatus 10 sets a range of $\alpha$ to $-\alpha$ from the collimation axis 40 in a yaw angle direction as the field of view range 41. Based on the user as a reference, it is assumed that an angle of leftward (counterclockwise) rotation is positive, and an angle of rightward (clockwise) rotation is negative.

For example, in a case where the notification target 42 is present in the range (the range of the field of view) of $\alpha$ to $-\alpha$ from the collimation axis 40 in the yaw angle direction, the information processing apparatus 10 does not display the arrow. In a case where the notification target 42 is present in a range of $-\alpha$ to $-180$ degrees from the collimation axis in the yaw angle direction, the information processing apparatus 10 displays a rightward arrow 43. In a case where the notification target 42 is present in a range of $\alpha$ to 180 degrees from the collimation axis in the yaw angle direction, the information processing apparatus 10 displays a leftward arrow 44.

In the present exemplary embodiment, the display of the rightward arrow 43 or the leftward arrow 44 depending on an angle between the collimation axis and the position of the presence of the notification target 42 in the yaw angle direction is described. However, the description is not for limitation purposes. The displayed arrow may be such that an angle of the displayed arrow is changed depending on the angle between the collimation axis and the position of the presence of the notification target 42 in the yaw angle direction. For example, the rightward arrow may be displayed in a case where the angle between the collimation axis and the notification target 42 is $-90$ degrees, and an arrow indicating a rear of the user may be displayed in a case where the angle is 180 degrees.

Figure 7:
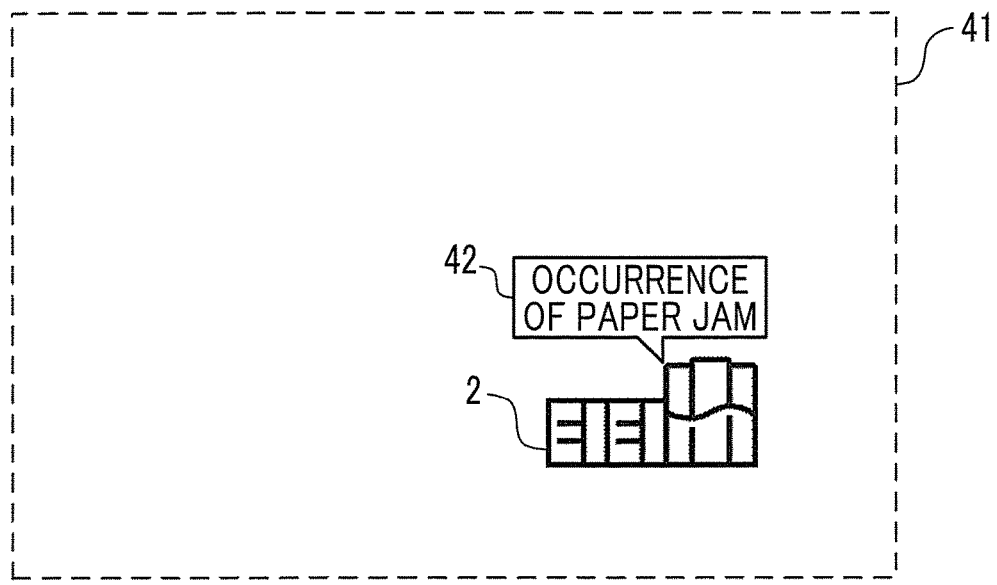
FIG. 7 is a schematic diagram illustrating one example of a display of the information processing apparatus according to each exemplary embodiment in description of a case where the notification target is present in the field of view.

Next, a display in a case where the notification target 42 is included in the field of view range 41 will be described with reference to FIG. 7. FIG. 7 is a schematic diagram illustrating one example of a display of the information processing apparatus 10 according to the present exemplary embodiment in description of a case where the notification target 42 is present in the field of view.

For example, as illustrated in FIG. 7, in a case where the notification target 42 is included in the field of view range 41, the information processing apparatus 10 displays the notification received from the notification target 42 through the notification management server 3 on the display 16. For example, in a case where the notification target 42 performs notification of information indicating a paper jam, the information processing apparatus 10 performs a display indicating a paper jam at the position associated with the notification target 42 on the display 16.

Figure 8:
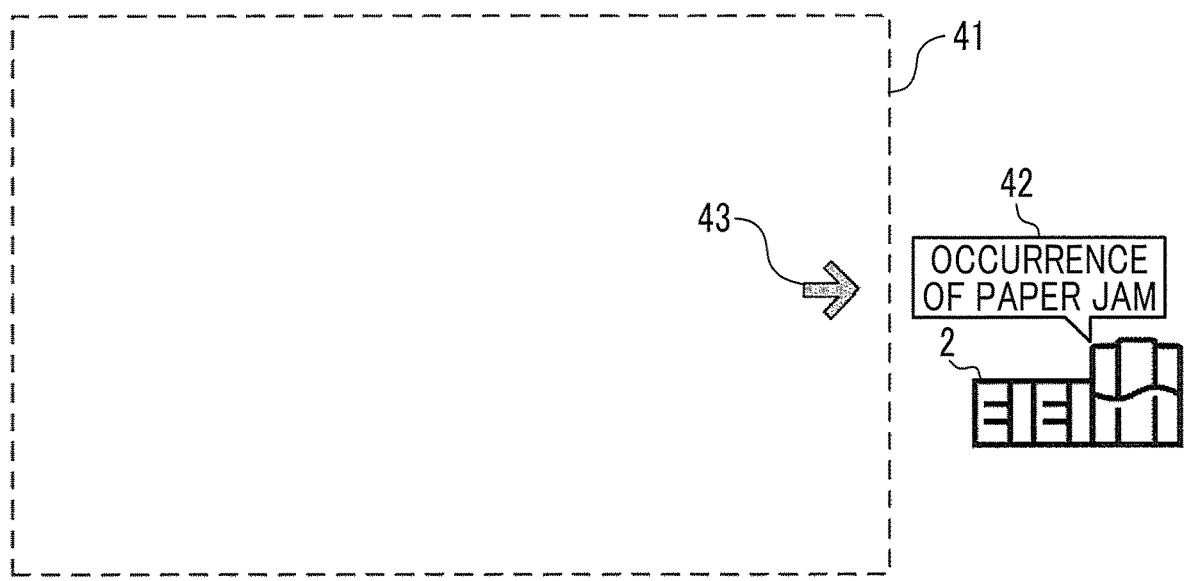
FIG. 8 is a schematic diagram illustrating one example of a display of the information processing apparatus according to each exemplary embodiment in description of a case where the notification target is present outside the field of view.

Next, a display in a case where the notification target 42 is not included in the field of view range 41 will be described with reference to FIG. 8. FIG. 8 is a schematic diagram illustrating one example of a display of the information processing apparatus 10 according to the present exemplary embodiment in description of a case where the notification target 42 is present outside the field of view.

For example, as illustrated in FIG. 8, in a case where the position associated with the notification target 42 is not included in the field of view range 41, that is, in a case where the position is present in a range of −α to −180 degrees from the collimation axis in the yaw angle direction, the information processing apparatus 10 displays the rightward arrow 43. In a case where the arrow is displayed, the information processing apparatus 10 displays the arrow by changing the color and the size of the arrow depending on acquired attribute information of the notification target 42 and the attribute information of the user. Specifically, the information processing apparatus 10 acquires a type of notification from the attribute information of the notification target 42, sets a color of the notification, and determines whether or not the display of the message is necessary. In addition, the information processing apparatus 10 calculates the association degree using the acquired attribute information of the notification target 42 and the user information. For example, in a case where the type of notification is "WARNING", a color of the rightward arrow 43 is displayed as yellow. In addition, the information processing apparatus 10 refers to the process information. In a case where a work is not scheduled for the apparatus performing the notification of the notification target 42, the information processing apparatus 10 sets a "low" association degree and displays the rightward arrow 43 in a small size.

Figure 9:
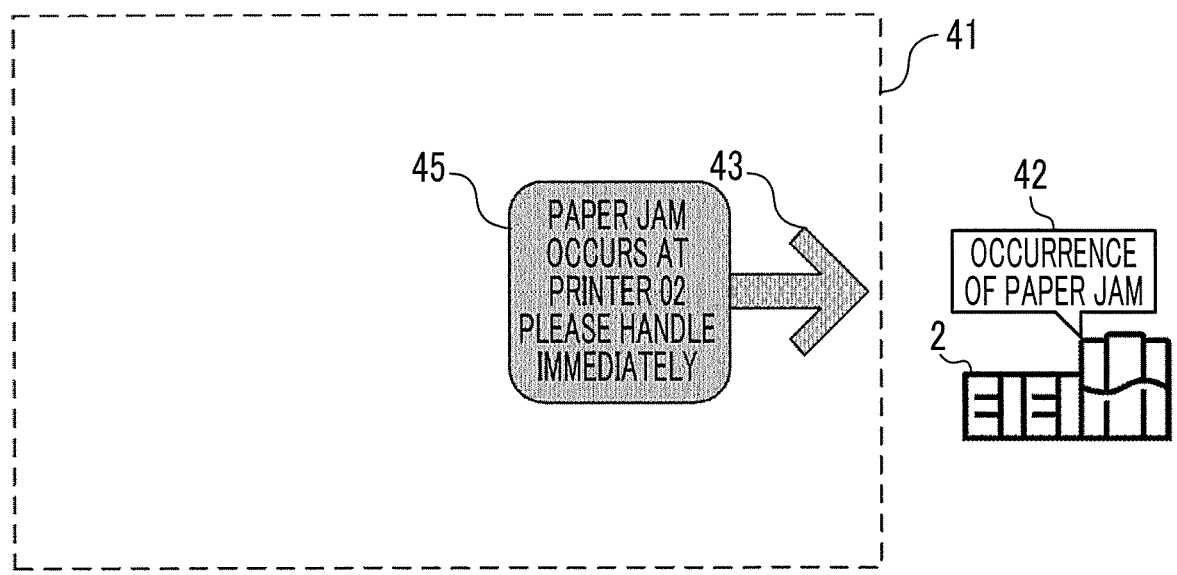
FIG. 9 is a schematic diagram illustrating one example of a display of the information processing apparatus according to each exemplary embodiment in description of a case where the notification target of which a type of notification is "ERROR" is present outside the field of view.

Next, a display in a case where the notification target 42 is not included in the field of view range 41 and the type of notification is "ERROR" will be described with reference to FIG. 9. FIG. 9 is a schematic diagram illustrating one example of a display of the information processing apparatus according to the present exemplary embodiment in description of a case where the notification target 42 of which the type of notification is "ERROR" is present outside the field of view;

For example, as illustrated in FIG. 9, in a case where the type of notification is "ERROR" and the position associated with the notification target 42 is not included in the field of view range 41 (present in a range of −α to −180 degrees from the collimation axis in the yaw angle direction), the information processing apparatus 10 displays the rightward arrow 43. For example, in a case where the type of notification included in the attribute information of the notification target 42 is "ERROR", the information processing apparatus 10 displays a message 45 along with the arrow. Specifically, in a case where the type of information acquired from the attribute information of the notification target 42 is "ERROR", the information processing apparatus 10 sets the color of the rightward arrow 43 to red and displays the message 45 for the user along with the rightward arrow 43.

Figure 10:
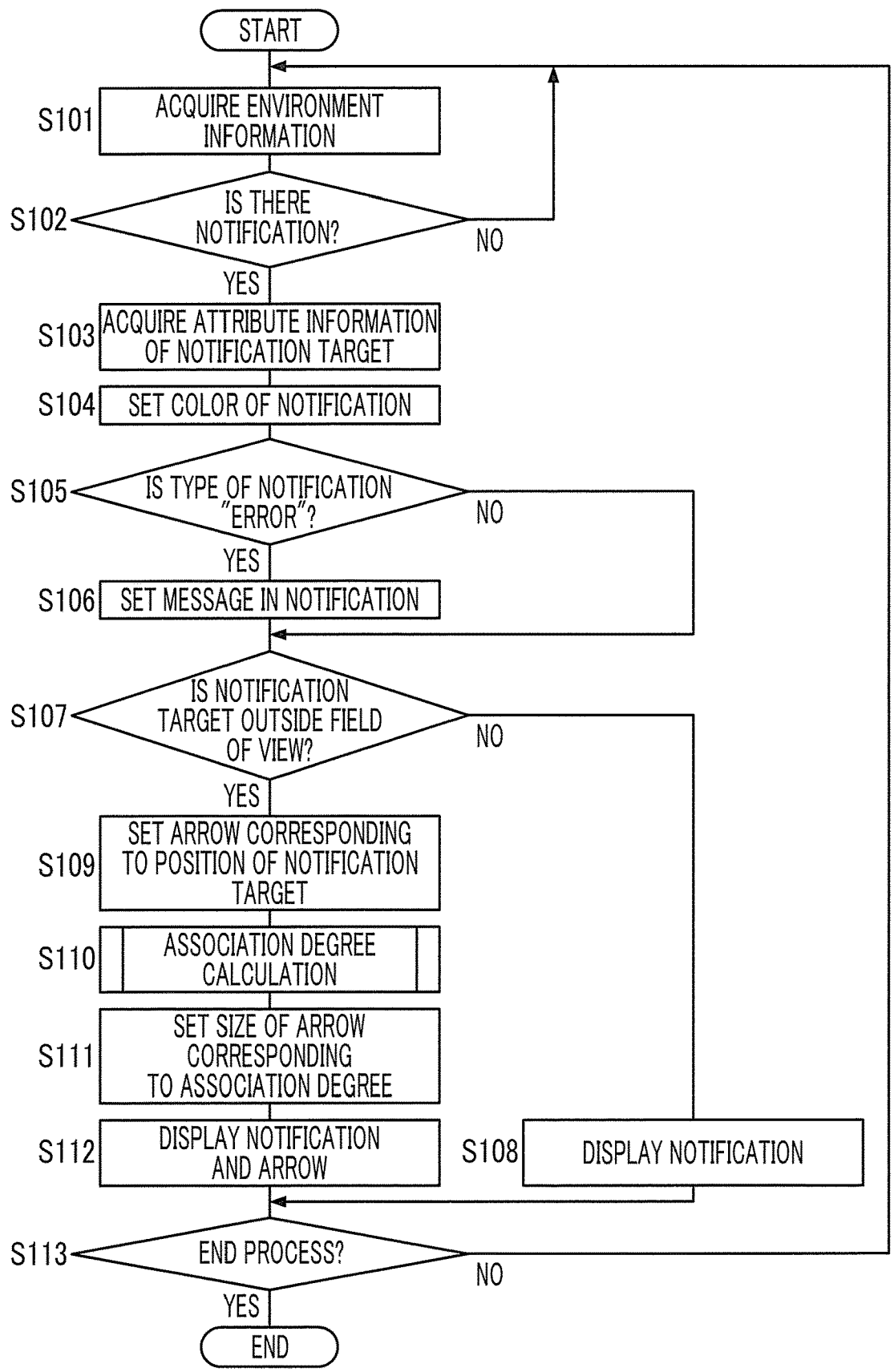
FIG. 10 is a flowchart illustrating one example of information processing according to each exemplary embodiment.
Figure 11:
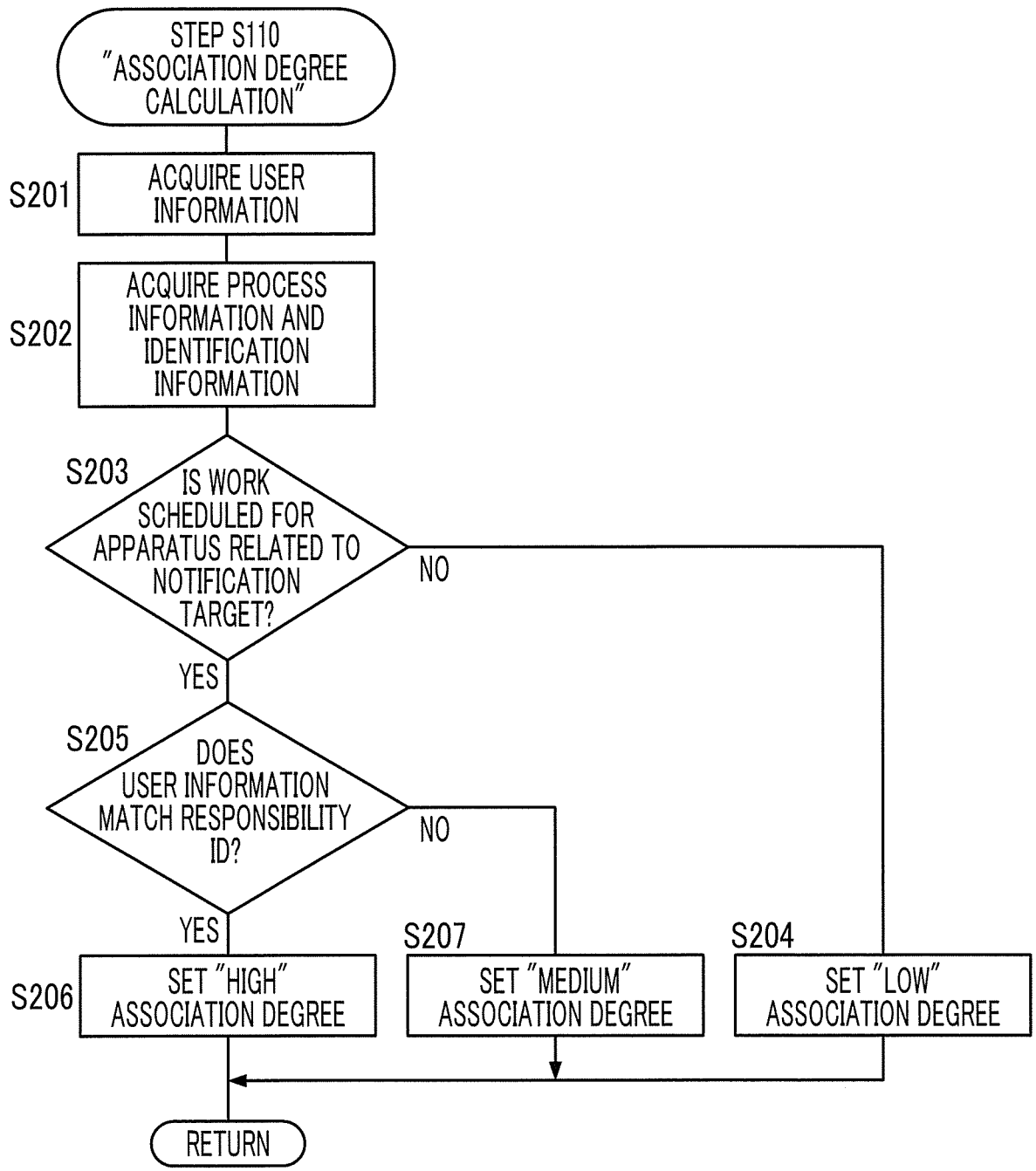
FIG. 11 is a flowchart illustrating one example of an association degree calculation process according to the first exemplary embodiment.

Next, an effect of the information processing program according to the present exemplary embodiment will be described with reference to FIG. 10 to FIG. 11. First, FIG. 10 is a flowchart illustrating one example of information processing according to the present exemplary embodiment. The information processing illustrated in FIG. 10 is executed by causing the CPU 11 to read the information processing program from the ROM 12 or the storage 14 and execute the information processing program. For example, the information processing illustrated in FIG. 11 is executed in a case where an instruction to execute the information processing program is input by the user.

In step S101, the CPU 11 acquires the environment information that includes the coordinates and the direction of the line of sight of the user and the coordinates of the apparatus 2.

In step S102, the CPU 11 determines whether or not the notification related to the notification target 42 is present. In a case where the notification related to the notification target 42 is present (step S102: YES), the CPU 11 transitions to step S103. In a case where the notification related to the notification target 42 is not present (step S102: NO), the CPU 11 transitions to step S101.

In step S103, the CPU 11 acquires the attribute information of the notification target 42 that includes the notification details of the notification target 42, the type of notification, the identification information of the notification target 42, and the process information. The CPU 11 associates the notification target 42 with the coordinates of the apparatus 2 included in the environment information.

In step S104, the CPU 11 acquires the type of notification from the acquired attribute information of the notification target 42 and sets the color of the notification.

In step S105, the CPU 11 determines whether or not the type of notification is "ERROR". In a case where the type of notification is "ERROR" (step S105: YES), the CPU 11 transitions to step S106. In a case where the type of notification is not "ERROR" (step S105: NO), the CPU 11 transitions to step S107.

In step S106, the CPU 11 sets the message 45 for the user.

In step S107, the CPU 11 determines whether or not the notification target 42 is outside the field of view. In a case where the notification target 42 is outside the field of view (step S107: YES), the CPU 11 transitions to step S109. In a case where the notification target 42 is not outside the field of view (step S107: NO), the CPU 11 transitions to step S108.

In step S108, the CPU 11 displays the notification details at the position associated with the notification target 42 in the field of view range 41.

In step S109, the CPU 11 calculates the angle between the direction of the line of sight of the user and the position associated with the notification target 42 and sets the arrow corresponding to the position associated with the notification target 42.

In step S110, the CPU 11 calculates the association degree using the attribute information of the user and the attribute information of the notification target. Details will be described in FIG. 11 later.

In step S111, the CPU 11 sets the size of the arrow corresponding to the calculated association degree.

In step S112, the CPU 11 displays the notification and the arrow on the display 16.

In step S113, the CPU 11 determines whether or not to end the process. In a case where the process is ended (step S113: YES), the CPU 11 ends the process. In a case where the process is not ended (step S113: NO), the CPU 11 transitions to step S101.

Next, an association degree calculation process according to the present exemplary embodiment will be described with reference to FIG. 11. FIG. 11 is a flowchart illustrating one example of the association degree calculation process according to the present exemplary embodiment. The association degree calculation process illustrated in FIG. 11 is executed by causing the CPU 11 to read an association degree calculation program from the ROM 12 or the storage 14 and execute the association degree calculation program.

In step S201, the CPU 11 acquires the user information.

In step S202, the CPU 11 acquires the process information and the identification information included in the attribute information.

In step S203, the CPU 11 determines whether or not a work is scheduled for the apparatus related to the notification target 42 using the acquired user information, process information, and identification information. In a case where a work is scheduled for the apparatus related to the notification target 42 (step S203: YES), the CPU 11 transitions to step S205. In a case where a work is not scheduled for the apparatus related to the notification target 42 (step S203: NO), the CPU 11 transitions to step S204.

In step S204, the CPU 11 sets the association degree to "low".

In step S205, the CPU 11 determines whether or not the user information matches the responsibility ID in the process information. In a case where the user information matches the responsibility ID of the process information in the notification target (step S205: YES), the CPU 11 transitions to step S206. In a case where the user information does not match the responsibility ID of the process information in the notification target (step S205: NO), the CPU 11 transitions to step S207.

In step S206, the CPU 11 sets the association degree to "high".

In step S207, the CPU 11 sets the association degree to "medium".

As described thus far, according to the present exemplary embodiment, the notification to be displayed is changed depending on situations of the user and the notification target 42. Accordingly, in a case where the notification related to the notification target 42 from the outside of the field of view is performed, the user determines the notification related to the user more easily than the user does with a display that is not based on the attribute information of the user.

Second Exemplary Embodiment

In the first exemplary embodiment, the setting of a high association degree in a case where a work is scheduled for the apparatus related to the notification target is described. In the present exemplary embodiment, a change of the association degree depending on the affiliation of the user will be described. A configuration (refer to FIG. 1) of an information processing system, a hardware configuration (refer to FIG. 2) of the information processing apparatus 10, a functional configuration (refer to FIG. 3) of the information processing apparatus 10, and a schematic diagram (refer to FIG. 5) illustrating a range of a field of view according to the present exemplary embodiment are identical to the configurations and the diagram of the first embodiment and thus, will not be described here. In addition, a displayed arrow, a schematic diagram (refer to FIG. 6) illustrating a relationship with the position of the notification target 42, and a schematic diagram (refer to FIG. 7) in a case where the notification target is present in the range of the field of view according to the present exemplary embodiment are identical to the arrow and the diagrams of the first embodiment and thus, will not be described here. In addition, a schematic diagram (refer to FIG. 8) in a case where the notification target is present outside the range of the field of view and a schematic diagram (refer to FIG. 9) in a case where the notification target of which the stepwise determined information is "ERROR" is present outside the range of the field of view according to the present exemplary embodiment are identical to the diagrams of the first embodiment and thus, will not be described here. In addition, a flowchart (refer to FIG. 10) of information processing according to the present exemplary embodiment is identical to the flowchart of the first embodiment and thus, will not be described here.

Setting of the association degree depending on the apparatus affiliation information and the user affiliation information according to the present exemplary embodiment will be described before description of an effect of the information processing apparatus 10.

For example, the user affiliation information includes an affiliation ID and a permission degree. The affiliation ID is a sign that is uniquely set for each affiliation to which the user or the apparatus belongs. The permission degree is a degree of permission to perform management for each user belonging to the affiliation. The permission degree according to the present exemplary embodiment will be described as including a "manager" and a "responsible person", and the "manager" will be described as having more permission. However, the description is not for limitation purposes. The permission degree may be stepwise set in detail like 1 to 5.

For example, the information processing apparatus 10 possesses the user affiliation information (the affiliation ID and the permission degree) as the attribute information of the user set in the information processing apparatus 10. The information processing apparatus 10 acquires the apparatus affiliation information (affiliation ID) from the attribute information of the notification target and compares the affiliation ID set in the information processing apparatus 10 with the affiliation ID of the notification target. In a case where the affiliation IDs match, the information processing apparatus 10 sets a high association degree and performs the notification. In addition, the information processing apparatus 10 sets a further high association degree and performs the notification depending on the permission degree set in the information processing apparatus 10.

Specifically, in a case where the affiliation ID set in the information processing apparatus 10 is "A" and the permission degree is the "manager", the information processing apparatus 10 determines whether or not the affiliation ID acquired from the attribute information of the notification target is "A". In a case where the affiliation ID acquired from the attribute information of the notification target is "A", the information processing apparatus 10 sets a high association degree and performs the notification. In addition, the information processing apparatus 10 determines whether or not the permission degree set in the information processing apparatus 10 is the "manager". In a case where the permission degree set in the information processing apparatus 10 is the "manager", the information processing apparatus 10 sets a further high association degree and performs the notification.

An effect of an information processing program according to the present exemplary embodiment will be described with reference to FIG. 12.

Figure 12:
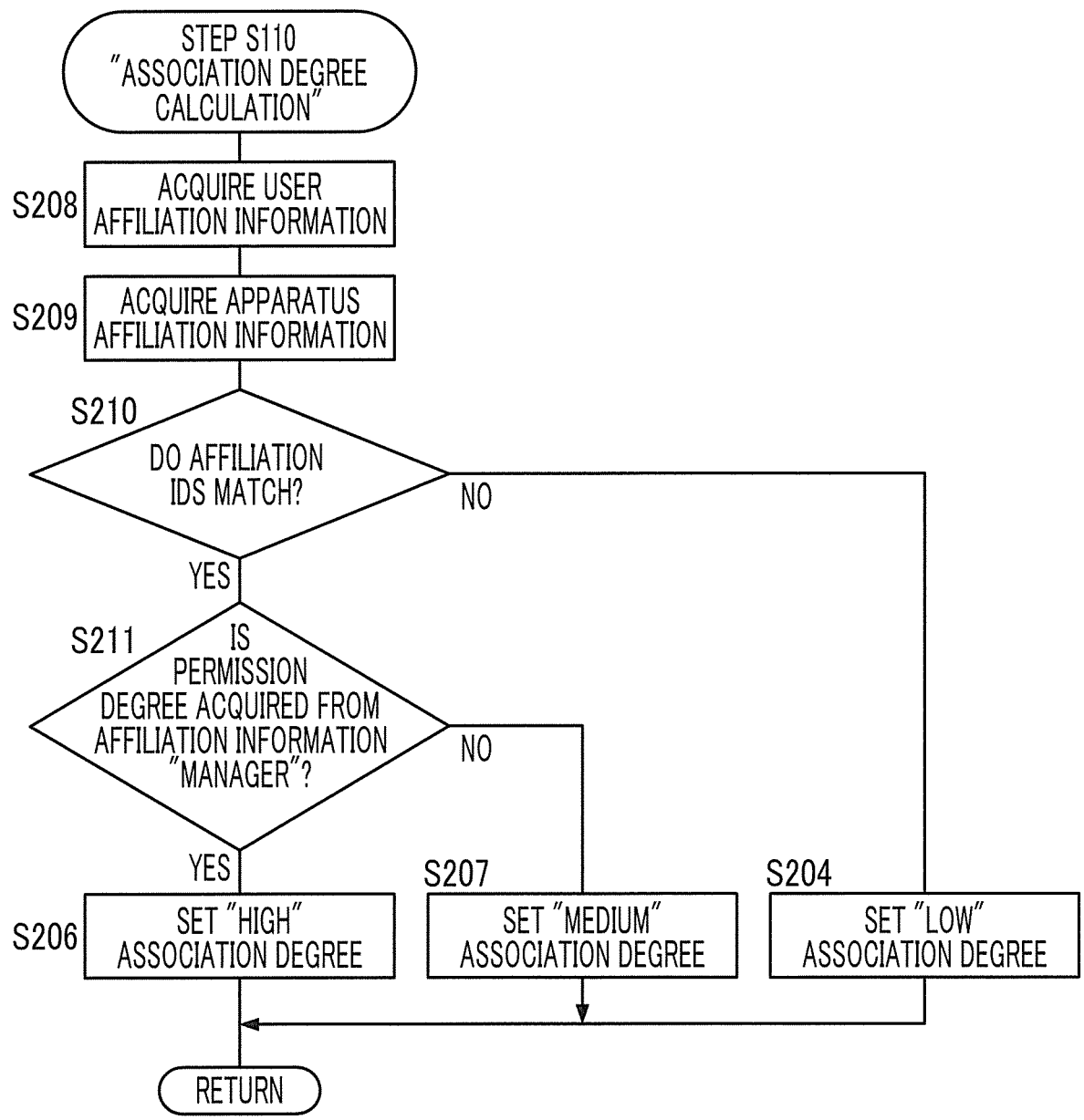
FIG. 12 is a flowchart illustrating one example of an association degree calculation process according to a second exemplary embodiment.

FIG. 12 is a flowchart illustrating one example of an association degree calculation process according to the second exemplary embodiment.

Information processing illustrated in FIG. 12 is executed by causing the CPU 11 to read an association degree calculation processing program from the ROM 12 or the storage 14 and execute the association degree calculation processing program.

For example, the association degree calculation process illustrated in FIG. 12 is executed in a case where an instruction to execute the information processing program is input by the user.

In FIG. 12, steps identical to the steps of the information processing illustrated in FIG. 11 will be designated by reference signs identical to the reference signs in FIG. 11 and will not be described here.

In step S208, the CPU 11 acquires the user affiliation information.

The user affiliation information is the affiliation ID and the permission degree possessed by the information processing apparatus 10 (terminal) mounted on the user.

In step S209, the CPU 11 acquires the apparatus affiliation information.

In step S210, the CPU 11 determines whether or not the affiliation ID acquired from the apparatus affiliation information matches the affiliation ID acquired from the user affiliation information. In a case where the affiliation IDs match (step S210: YES), the CPU 11 transitions to step S211. In a case where the affiliation IDs do not match (step S210: NO), the CPU 11 transitions to step S204.

In step S211, the CPU 11 determines whether or not the permission degree acquired from the user affiliation information is the "manager". In a case where the permission degree acquired from the user affiliation information is the "manager" (step S211: YES), the CPU 11 transitions to step S206. In a case where the permission degree acquired from the user affiliation information is not the "manager" (step S211: NO), the CPU 11 transitions to step S207.

As described thus far, according to the present exemplary embodiment, the notification is changed depending on the affiliations to which the notification target 42 and the user belong.

The information processing apparatus 10 according to the present exemplary embodiment is described as changing the display of the notification for each user using the affiliation ID. However, the description is not for limitation purposes. For example, a terminal ID that is uniquely assigned to each terminal which is the information processing apparatus 10 may be possessed, and the user information and the user affiliation information may include the terminal ID. The information processing apparatus 10 may change the display of the notification depending on the terminal ID.

In addition, the affiliation ID according to the present exemplary embodiment is described as being uniquely assigned to each user. However, the description is not for limitation purposes. The user information and the user affiliation information may possess a worker ID that is an ID appropriately assigned by associating the information processing apparatus 10 with the user on which the information processing apparatus 10 is mounted. The ID may be appropriately assigned to the user or the terminal mounted on the user depending on a work and a process. For example, for any user, a worker ID indicating the manager may be assigned in a certain work, and a worker ID indicating the responsible person may be assigned in another work.

In addition, the user information according to the present exemplary embodiment is described as being possessed by each information processing apparatus 10 (terminal). However, the description is not for limitation purposes. The information processing apparatus 10 may be a server and manage the user information assigned to each display device mounted on the user.

In addition, the process information according to the present exemplary embodiment is described as being information of a series of processes performed by one or plural apparatuses 2. However, the description is not for limitation purposes. For example, the process information may be possessed by each apparatus 2 as information of a process performed by each apparatus 2.

In addition, the display according to the present exemplary embodiment is described such that the display is controlled to be changed depending on the association degree. However, the description is not for limitation purposes. In a case where the association degree is low, the notification may be controlled not to be displayed.

In addition, the information processing apparatus 10 according to the present exemplary embodiment is described as acquiring the attribute information of the notification target including the identification information, the process information, and the affiliation information and controlling the notification by associating the affiliation information of the user possessing the terminal which is the information processing apparatus 10 with the attribute information of the notification target. However, the description is not for limitation purposes. For example, the notification management server 3 may acquire the user affiliation information from the terminal, control the notification by associating the attribute information of the notification target possessed by the notification management server 3 including the identification information, the process information, the attribute information, and the like with the attribute information of the user, and transmit the notification to each terminal. In addition, a server that manages information may acquire the attribute information of the user and the attribute information of the notification target and display the notification corresponding to the attribute information of the user and the attribute information of the notification target on the terminal mounted on the user.

In addition, the attribute information of the notification target according to the present exemplary embodiment is described as including the process information related to the apparatus, and the notification is described as being controlled by associating the attribute information of the notification target with the attribute information of the user. However, the description is not for limitation purposes. For example, the process information may be included in the attribute information of the user, and the information processing apparatus 10 may acquire the attribute information of the notification target including the identification information and display the notification.

Besides, the configuration of the information processing apparatus 10 described in the exemplary embodiments is one example and may be changed depending on a situation without departing from a gist of the information processing apparatus 10.

In addition, the flow of process of the program described in the exemplary embodiments is one example. Removal of an unnecessary step, addition of a new step, or replacement of a processing order may be carried out without departing from a gist of the program.

In the embodiments above, the term "processor" refers to hardware in abroad sense. Examples of the processor include general processors (e.g., CPU: Central Processing Unit), dedicated processors (e.g., GPU: Graphics Processing Unit, ASIC: Application Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

In addition, while the information processing program is described as being stored (installed) in advance in the storage 14 in each of the exemplary embodiments, the description is not for limitation purposes. The program may be provided as a recording on a recording medium such as a compact disc read only memory (CD-ROM), a digital versatile disc read only memory (DVD-ROM), and a Universal Serial Bus (USB) memory. In addition, the program may be downloaded from an external apparatus through a network.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
   a processor configured to:
   control a display of notification related to a notification target present outside a field of view of a user depending on a relationship between attribute information of the notification target and attribute information of the user, wherein the notification target comprising coordinates in a three-dimensional space and notification information associated with the coordinates in the three-dimensional space; and
   provide guidance to a position of the notification target by displaying an arrow indicating the coordinates in the three-dimensional space,
   wherein the attribute information of the notification target includes identification information that is information for identifying an apparatus related to the notification target, and process information that is information related to a process performed by the apparatus, and
   the attribute information of the user includes user information that is information for identifying a user, and
   the processor further configured to:
   when the user identified by the user information matches a user associated with the process information, make the display different from a display in the case where the user identified by the user information does not match the user associated with the process information.

2. The information processing apparatus according to claim 1,
   wherein the attribute information of the notification target includes stepwise determined information, and
   the processor changes a form of displaying the notification depending on the stepwise determined information.

3. The information processing apparatus according to claim 2,
   wherein in a case where the stepwise determined information satisfies a predetermined condition, the processor displays at least one of a text, an image, or a motion picture showing a change of an image related to the notification target in the field of view of the user in addition to the notification.

4. The information processing apparatus according to claim 3,
   wherein the notification is controlled based on the identification information and the process information.

5. The information processing apparatus according to claim 4,
   wherein the processor controls the notification to be displayed based on the user information, the identification information, and the process information.

6. The information processing apparatus according to claim 5,
   wherein in a case where the notification target is a notification target related to an apparatus for which a work is scheduled in the process information, the processor sets a high association degree that indicates a degree of association between the notification target and the user, and controls the notification to be displayed depending on the association degree.

7. The information processing apparatus according to claim 2,
   wherein the notification is controlled based on the identification information and the process information.

8. The information processing apparatus according to claim 7,
   wherein the processor controls the notification to be displayed based on the user information, the identification information, and the process information.

9. The information processing apparatus according to claim 8,
   wherein in a case where the notification target is a notification target related to an apparatus for which a work is scheduled in the process information, the processor sets a high association degree that indicates a degree of association between the notification target and the user, and controls the notification to be displayed depending on the association degree.

10. The information processing apparatus according to claim 2,
    wherein the attribute information of the user includes user affiliation information that is information indicating an affiliation to which the user belongs,
    the attribute information of the notification target includes apparatus affiliation information that is information indicating an affiliation to which an apparatus related to the notification target belongs, and
    in a case where the user affiliation information matches the apparatus affiliation information, the processor sets a high association degree that indicates a degree of association between the notification target and the user, and controls the notification to be displayed depending on the association degree.

11. The information processing apparatus according to claim 1,
    wherein the notification is controlled based on the identification information and the process information.

12. The information processing apparatus according to claim 11,
    wherein the processor controls the notification to be displayed based on the user information, the identification information, and the process information.

13. The information processing apparatus according to claim 10,
    wherein in a case where the notification target is a notification target related to an apparatus for which a work is scheduled in the process information, the processor sets a high association degree that indicates a degree of association between the notification target and the user, and controls the notification to be displayed depending on the association degree.

14. The information processing apparatus according to claim 1,
    wherein the attribute information of the user includes user affiliation information that is information indicating an affiliation to which the user belongs,
    the attribute information of the notification target includes apparatus affiliation information that is information indicating an affiliation to which an apparatus related to the notification target belongs, and in a case where the user affiliation information matches the apparatus affiliation information, the processor sets a high association degree that indicates a degree of association between the notification target and the user, and controls the notification to be displayed depending on the association degree.

15. The information processing apparatus according to claim 14, wherein the user affiliation information includes a permission degree that indicates a degree of permission to perform management for each user belonging to the affiliation, and the processor sets a high association degree depending on a level of the permission degree.

16. The information processing apparatus according to claim 1, wherein in a case where the notification target is included in the field of view, the processor controls the display of the notification related to the notification target present in the field of view of the user depending on the attribute information of the notification target.

17. A non-transitory computer readable medium storing an information processing program causing a computer to execute a process for information processing, the process comprising:

controlling a display of notification related to a notification target present outside a field of view of a user depending on a relationship between attribute information of the notification target and attribute information of the user, wherein the notification target comprising coordinates in a three-dimensional space and notification information associated with the coordinates in the three-dimensional space; and providing guidance to a position of the notification target by displaying an arrow indicating the coordinates in the three-dimensional space, making the display different from a display in the case where the user identified by the user information does not match a user associated with the process information when the user identified by the user information matches the user associated with the process information, wherein the attribute information of the notification target includes identification information that is information for identifying an apparatus related to the notification target, and process information that is information related to a process performed by the apparatus, and the attribute information of the user includes user information that is information for identifying a user.

* * * * *